(12) United States Patent
Tang et al.

(10) Patent No.: US 7,592,895 B2
(45) Date of Patent: Sep. 22, 2009

(54) SYSTEM AND METHOD FOR REMOTELY CONTROLLING A FUNCTION

(75) Inventors: Tom Q. Tang, Novi, MI (US); John Nantz, Brighton, MI (US); Ronald O. King, Brownstone, MI (US)

(73) Assignee: Lear Corporation, Southfield, MI (US)

( * ) Notice: Subject to any disclaimer, the term of this patent is extended or adjusted under 35 U.S.C. 154(b) by 662 days.

(21) Appl. No.: 11/163,376

(22) Filed: Oct. 17, 2005

(65) Prior Publication Data

US 2007/0085656 A1  Apr. 19, 2007

(51) Int. Cl.
*H04B 1/02* (2006.01)
(52) U.S. Cl. ............... 340/5.64; 340/5.61; 340/825.69; 340/825.72
(58) Field of Classification Search .......... 340/5.5, 340/5.61, 5.64, 10.1–10.6, 825.69, 825.72, 340/426.16, 5.33; 341/176; 123/179.2; 318/16
See application file for complete search history.

(56) References Cited

U.S. PATENT DOCUMENTS

| | | | |
|---|---|---|---|
| 4,914,428 A | 4/1990 | Kobayashi et al. | |
| 5,193,210 A | 3/1993 | Nicholas et al. | |
| 5,355,525 A | 10/1994 | Lindmayer et al. | |
| 5,600,323 A * | 2/1997 | Boschini | 341/173 |
| 6,466,137 B1 | 10/2002 | Lin et al. | |
| 6,885,282 B2 * | 4/2005 | Desai et al. | 340/5.61 |
| 2001/0038328 A1 | 11/2001 | King et al. | |
| 2006/0076948 A1 * | 4/2006 | Gutierrez | 324/207.13 |
| 2006/0199560 A1 * | 9/2006 | Crivelli | 455/293 |

FOREIGN PATENT DOCUMENTS

DE  10004213  8/2001

OTHER PUBLICATIONS

Danilenko et al., Noise-protected pulse selector has low and high amplitude clipping circuits coupled to selector transistor input and output RC-network, Dec. 30, 1980, Derwent Abstract.*

* cited by examiner

*Primary Examiner*—Daniel Wu
*Assistant Examiner*—Ryan W Sherwin
(74) *Attorney, Agent, or Firm*—Brooks Kushman P.C.

(57) ABSTRACT

A system and method for remotely controlling a function. A range-limited function is performed when a wireless control signal is indicative of a range-limited function and an elapsed time value exceeds a threshold value.

20 Claims, 3 Drawing Sheets

SYSTEM AND METHOD FOR REMOTELY CONTROLLING A FUNCTION

BACKGROUND OF THE INVENTION

Field of the Invention

The present invention relates to a system and method for controlling a function, such as a vehicle function.

SUMMARY OF THE INVENTION

In at least one embodiment of the present invention, a system for remotely controlling a function is provided. The system includes a transmitter, a receiver, and a receiver control circuit. The transmitter transmits a wireless control signal indicative of a function request. The receiver receives the wireless control signal. The receiver control circuit determines when the function request is indicative of a range-limited function and measures an elapsed time value. The elapsed time value is measured from an end of the wireless control signal until a noise signal is detected. The range-limited function is performed when the wireless control signal is indicative of a range-limited function and the elapsed time value exceeds a threshold value.

In at least one embodiment of the present invention, a method of controlling a function is provided. The method includes the steps of transmitting a wireless control signal with a transmitter, receiving the wireless control signal with a receiver, determining whether the wireless control signal is indicative of a range-limited function, determining an elapsed time value when the wireless control signal is indicative of a range-limited function, and performing the range-limited function when the elapsed time value exceeds a threshold value.

In at least one other embodiment, a method of controlling a vehicle function with a remote keyless entry system is provided. The remote keyless entry system includes a vehicle-mounted receiver control circuit having a receiver and a remote keyless entry fob. The remote keyless entry fob has a transmitter and an input device. The method includes the steps of actuating the input device, transmitting a wireless control signal based on actuation of the input device, receiving the wireless control signal with the receiver, decoding the wireless control signal with the receiver control circuit to determine whether the wireless control signal is indicative of a range-limited function or a non-range-limited function, determining an elapsed time value when the wireless control signal is indicative of a range-limited function, and performing the range-limited function when the wireless control signal is indicative of the range-limited function and the elapsed time value exceeds a threshold value. The elapsed time value increases as the distance between the transmitter and the receiver decreases.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
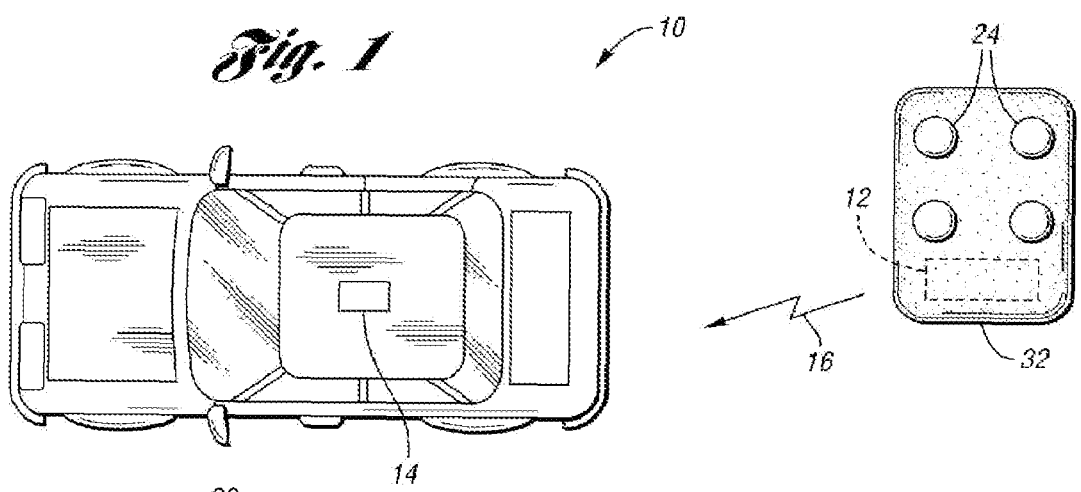
FIG. 1 is a schematic diagram of a system for remotely controlling a function according to one embodiment of the present invention.

Referring to FIG. 1, a schematic diagram of a system 10 for remotely controlling a function is shown. In the embodiment shown, the system 10 is configured as a remote keyless entry system for a motor vehicle. Although the system 10 is primarily described in a vehicle context, it is contemplated that the invention may be implemented to control any appropriate function in connection with any appropriate system and/or device.

The system 10 may include a transmitter 12 and a receiver 14. The transmitter 12 may be remotely located from the receiver 14 and may be electronically coupled (i.e., in electronic communication) with the receiver 14 via a wireless electronic signal 16. Moreover, the transmitter 12 and receiver 14 may be configured for unidirectional or bidirectional communication.

The system 10 may be configured as an active or passive system. In an active system, an operator actuates an input device, such as a switch or button, to perform a desired function, such as locking or unlocking a vehicle door. In a passive system, actuation of an input device is not needed to perform a desired function. Instead, a function may be automatically performed as the transmitter 12 approaches or moves away from the receiver 14. For instance, in an embodiment having a vehicle-mounted receiver, a vehicle door may be automatically locked when the transmitter 12 is brought sufficiently close to the vehicle and may be automatically unlocked as the transmitter 12 moves away from the vehicle.

Figure 2:
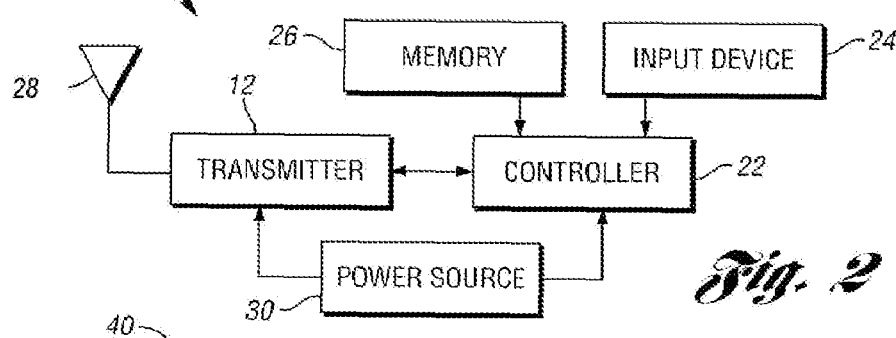
FIG. 2 is a schematic diagram of a transmitter control circuit that may be provided with the system.

Referring to FIG. 2, an exemplary transmitter control circuit 20 is shown. The transmitter control circuit 20 may include the transmitter 12, a transmitter controller 22, at least one input device 24, a memory device 26, an antenna 28 for communicating the wireless control signal 16, and a power source 30 for powering one or more aspects of the transmitter control circuit 20.

The transmitter 12 may be any suitable electronic device capable of generating the wireless electronic signal 16, such as a transponder, transceiver, or the like. The transmitter 12 may generate the wireless electronic signal 16 at one or more power levels and at one or more frequencies or frequency deviations as will be discussed in more detail below. In the embodiment shown in FIG. 1, the transmitter 12 is part of a handheld remote control unit 32, commonly referred to as a "fob". Alternatively, the transmitter 12 may be part of an ignition key head or any other suitable remote control device.

The transmitter controller 22 may control the generation of the wireless control signal 16 by the transmitter 12. In an embodiment configured as an active system, the transmitter controller 22 may receive an input signal from one or more input devices 24 and facilitate the generation of a specific wireless control signal or a portion thereof based on the input signal.

Figure 3:
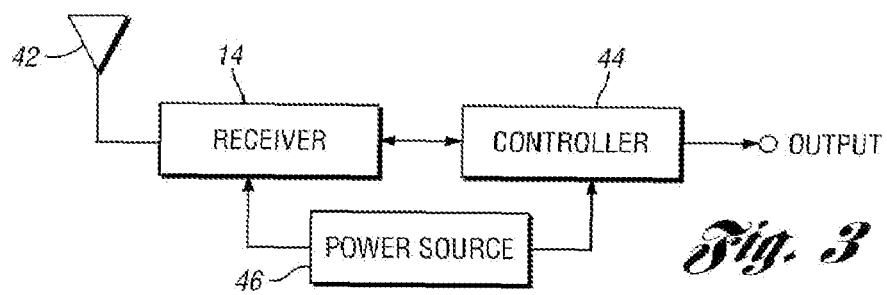
FIG. 3 is a schematic diagram of a receiver control circuit that may be provided with the system.

Referring to FIG. 3, an exemplary receiver control circuit 40 is shown. The receiver control circuit 40 may include the receiver 14, an antenna 42, a receiver controller 44, and a power source 46 for powering one or more aspects of the receiver control circuit 40.

The receiver 14 may be any suitable electronic device capable of receiving the wireless electronic signal 16 from the transmitter 12. For instance the receiver 14 may be configured as a transceiver or transponder. In at least one embodiment, the receiver 14 may receive the wireless electronic signal 16 via the antenna 42. The transmitter 12 may be disposed on a vehicle and may be directly or indirectly electronically coupled to one or more systems or devices that may execute a function.

The receiver controller 44 may control the decoding of the wireless control signal 16. More specifically, the receiver controller 44 may be electronically coupled to the receiver 14 and may decode, demodulate, or decipher the wireless electronic signal 16 or a portion thereof so that a requested function may be determined. The receiver controller 44 may be electronically coupled to one or more systems or devices that may execute a function. For example, the receiver controller 44 may provide an output signal to one or more actuators or electronic devices to control execution of a function. In a vehicular context, these functions may include, but are not limited to actuating a window, actuating a vehicle closure (e.g., door or convertible top), actuating a locking mechanism for a vehicle closure like a door or trunk, and operating an ignition system, alarm system, and/or interior or exterior lights.

Figure 4:
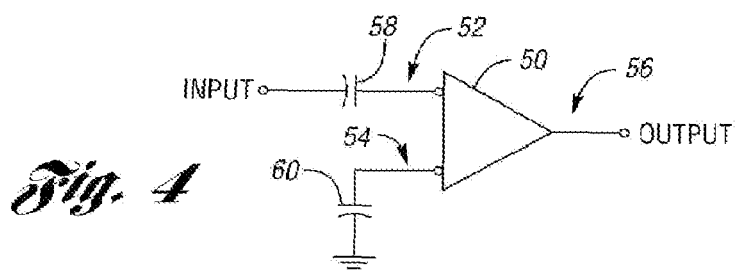
FIG. 4 is a schematic diagram of a portion of the receiver control circuit having a comparator.

Referring to FIG. 4, the receiver controller 44 or another portion of the receiver control circuit 40 may include a comparator 50. The comparator 50 may include a first input 52, a second input 54, and an output 56. The first input 52 may receive an input signal from the receiver that is based on the wireless control signal 16. For example, the input signal may be provided by the receiver 14 in response to reception of the wireless control signal 16. An electrical power source 58, such as a capacitor that stores an electrical charge, may be associated with the first input 52. The electrical charge stored by the electrical power source 58 may be a function of the strength of the wireless control signal 16. For instance, the amount of electrical charge stored may increase as the distance between the transmitter 12 and receiver 14 decreases when the wireless control signal 16 is provided at a single power level. Another electrical power source 60, such as a capacitor that stores an electrical charge, may be associated with the second input 54. The output 56 may provide an output signal that is a function of the voltage provided to the first and second inputs 52,54.

Figure 5:
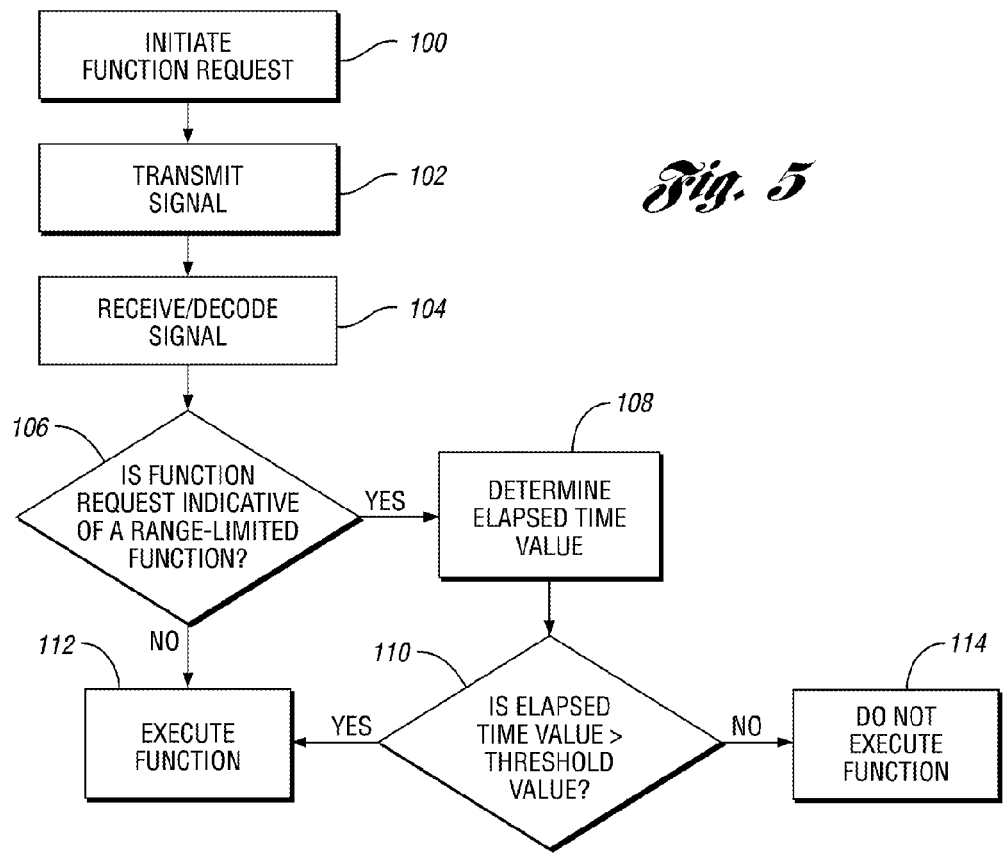
FIG. 5 is a flowchart of a method for controlling a function according to one embodiment of the present invention.

Referring to FIG. 5, a flowchart of a method for controlling a function according to one embodiment of the present invention is shown. As will be appreciated by one of ordinary skill in the art, the flowchart represents control logic which may be implemented using hardware, software, or a combination of hardware and software. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Figure 6:
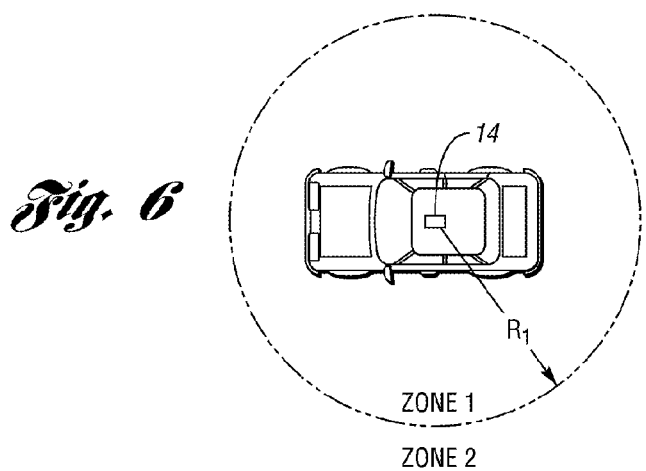
FIG. 6 is a graphical depiction of a plurality of zones associated with the control of a function.

The method may inhibit the execution of one or more functions based on the location of the transmitter 12 relative to the receiver 14. A graphical depiction of this concept is shown in FIG. 6. In FIG. 6, a plurality of zones are shown relative to a vehicle-mounted receiver 14. For simplicity, two zones (designated "zone 1" and "zone 2") are shown, although any suitable number of zones may be provided. The zone closest to the vehicle (zone 1) is located within a predetermined distance (R1) from the receiver 14. The second zone (zone 2) extends beyond R1 and may be limited by the communication range of the system. One or more functions may be enabled when the transmitter is within zone 1 and disabled when the transmitter is outside zone 1 or vice versa. Similarly, other functions may be performed when the transmitter is in zone 1 or zone 2.

At 100, the method may begin when execution of a function is requested. In an active system, execution of a function may be requested using the input device as previously described. In a passive system, execution of a function may be based on a change in position of the transmitter relative to the receiver.

At 102, the wireless control signal is transmitted. The wireless control signal may include a partial or complete "message" or function request. For instance, the wireless control signal may include encoded information that identifies the transmitter and the function or functions being requested. The wireless control signal may be generated and transmitted using the transmitter and may be received by the receiver as previously described.

At 104, the wireless control signal, if received, may be decoded using the receiver, receiver controller and/or another logical device in electronic communication with the receiver to identify the requested function.

At 106, the method determines whether a range-limited function has been requested. A range-limited function is a function that may be executed when the transmitter is within a predetermined distance or range from the receiver. For example, functions such as unlocking a vehicle closure, actuating a vehicle closure, or actuating a vehicle window may only be permitted when the transmitter is sufficiently close to the receiver. Other functions, such as locking a closure, remote engine startup, activating internal and/or external vehicle lights, and/or activating an alarm system or "panic" function may not be range-limited. Of course, these designations are merely exemplary; designation of a function as being range-limited or not range-limited may vary depending on design requirements. The determination as to whether a function is range-limited may be accomplished in any suitable manner. For example, a lookup table may be used to store a list of functions and their associated range designations in a manner known by those skilled in the art. If the function request is indicative of a range-limited function, then the method continues at block 108. If the function request is not indicative of a range-limited function (i.e., a "non-range-limited function" is requested), then the non-range-limited function is executed at block 112.

Figure 7:
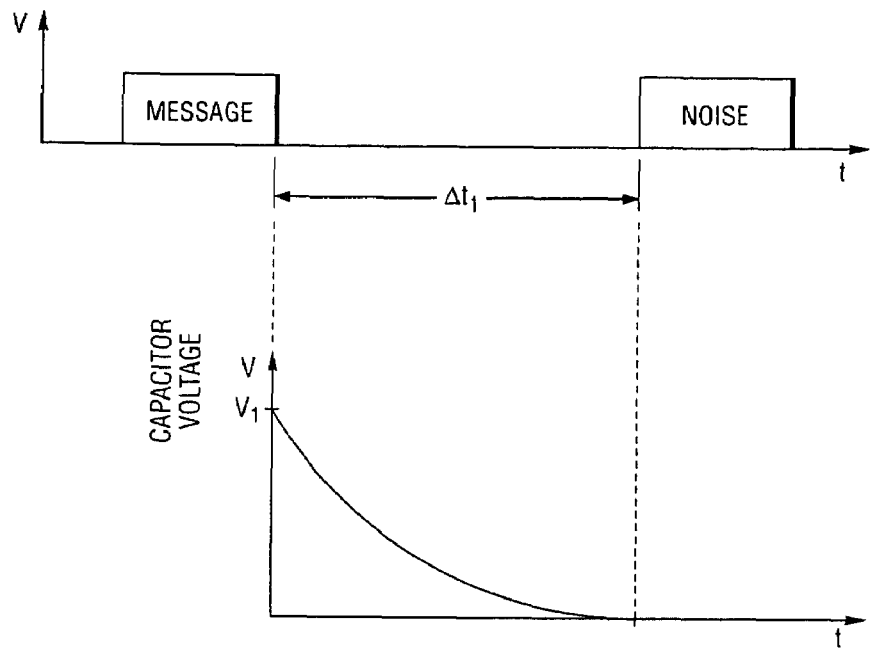
FIG. 7 are exemplary plots of an elapsed time value and capacitor discharge when the transmitter is disposed near the receiver.
Figure 8:
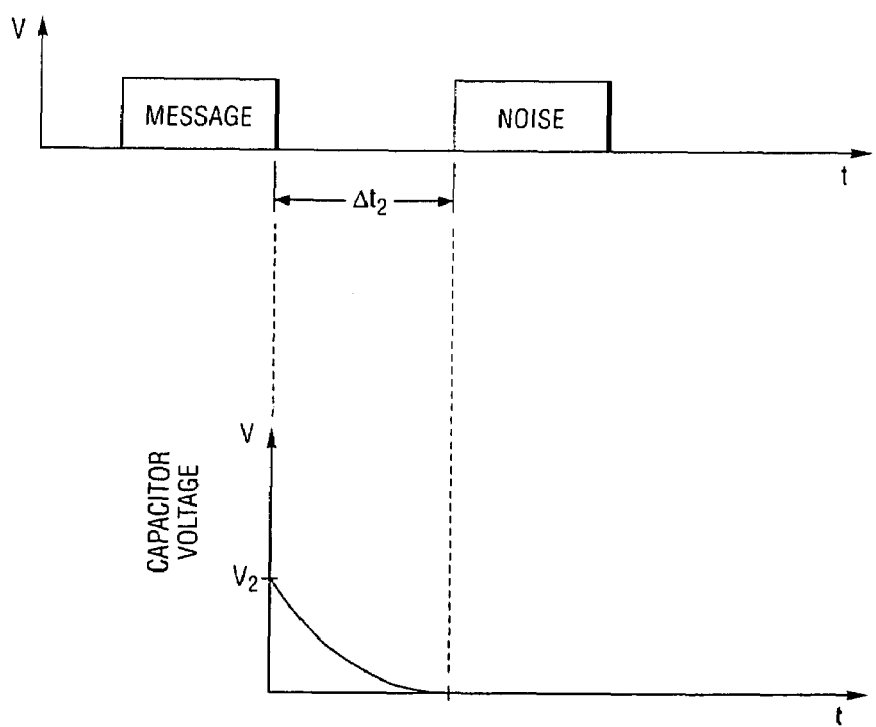
FIG. 8 are exemplary plots of the elapsed time value and capacitor discharge when the transmitter is not disposed near the receiver.

At 108, an elapsed time value is measured. The elapsed time value may be an amount of time elapsed between the end of the wireless control signal or a portion thereof and the presence a noise signal. The noise signal may be detected at the output of the comparator. Moreover the noise signal may occur when at least one electrical power source, such as a capacitor electrically coupled to a comparator input, is fully or sufficiently discharged as previously described. As previously discussed, stored charge in the electrical power source may be a function of the distance between the transmitter and the receiver. A graphical depiction of this concept is shown in FIGS. 7 and 8. FIG. 7 depicts an elapsed time value (designated $\Delta t_1$) and capacitor voltage when the transmitter is disposed near the receiver. FIG. 8 depicts an elapsed time value (designated $\Delta t_2$) and capacitor voltage when the transmitter is not disposed near the receiver. A comparison of FIGS. 7 and 8 shows that the capacitor voltage at the beginning of the capacitor voltage plot (i.e., at the end of the message) is greater when the transmitter is near the receiver (FIG. 7) than when the transmitter is further from the receiver (FIG. 8). Since a noise signal is not generated until the capacitor sufficiently discharges, the elapsed time value is greater when the transmitter is near the receiver than when the transmitter is further from the receiver ($\Delta t_1 > \Delta t_2$). As such, the elapsed time value increases as the distance between the transmitter and the receiver decreases.

At 110, the elapsed time value is compared to a threshold value. The threshold value may be any suitable value and may be determined by development testing. For example, the threshold value may be established to generally correspond with a predetermined distance from the receiver. If the elapsed time value exceeds the threshold value, then the transmitter is within a predetermined distance from the receiver and the range-limited function is executed at block 112. If the elapsed time value does not exceed the threshold value, then the transmitter is not within the predetermined distance from the receiver and the range-limited function is not executed at block 114.

The present invention may allow one or more functions to be executed or inhibited based on frequency deviation and/or receiver sensitivity characteristics rather than by calculating the strength or power of a signal from the transmitter, thereby avoiding the complexities associated with determining the power of a signal. In addition, the present invention may allow execution of a function to be tailored to manufacture or customer requirements. For example, a controller may perform door lock and/or unlock functions when the transmitter is within a predetermined radius of the receiver. By performing a door lock/unlock function only when the remote transmitter is determined to be within a predetermined radius of the receiver, the method may reduce the likelihood that an operator may unintentionally lock/unlock a vehicle door from a far distance. Moreover, in at least one embodiment, the present invention may allow multi-range control of various devices using conventional remote keyless entry system components, thereby yielding little cost impact.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remotely controlling a function, the system comprising:
    a transmitter for transmitting a wireless control signal indicative of a function request;
    a receiver for receiving the wireless control signal; and
    a receiver control circuit for determining when the function request is indicative of a range-limited function and for measuring an elapsed time value, the elapsed time value being measured from an end of the wireless control signal until a noise signal is detected;
    wherein the range-limited function is performed when the wireless control signal is indicative of a range-limited function and the elapsed time value exceeds a threshold value.

2. The system of claim 1 wherein the elapsed time value is indicative of the distance between the transmitter and the receiver.

3. The system of claim 1 wherein the transmitter transmits the wireless control signal at a single power level.

4. The system of claim 1 wherein the receiver control circuit further comprises:
    a comparator having an input and an output at which the noise signal is detected; and
    a capacitor electrically coupled to the input;
    wherein the noise signal is inhibited until the capacitor is sufficiently discharged.

5. The system of claim 4 wherein the elapsed time value varies in proportion to an electrical charge stored by the capacitor and wherein the electrical charge increases as a distance between the transmitter and the receiver decreases.

6. The system of claim 1 wherein the receiver is disposed on a motor vehicle and the transmitter is a remote keyless entry fob.

7. The system of claim 6 wherein the remote keyless entry fob is an active remote keyless entry fob.

8. The system of claim 6 wherein the remote keyless entry fob is a passive remote keyless entry fob.

9. A method of controlling a function, the method comprising:
    transmitting a wireless control signal with a transmitter;
    receiving the wireless control signal with a receiver;
    determining whether the wireless control signal is indicative of a range-limited function;
    determining an elapsed time value when the wireless control signal is indicative of a range-limited function, the elapsed time value being measured from an end of the wireless control signal to detection of noise by the receiver; and
    performing the range-limited function when the elapsed time value exceeds a threshold value.

10. The method of claim 9 wherein the step of performing the range-limited function further comprises not performing the range-limited function when the elapsed time value does not exceed the threshold value.

11. The method of claim 9 wherein the step of determining whether the wireless control signal is indicative of a range-limited function further comprises performing the function when the wireless control signal is not indicative of a range-limited function.

12. The method of claim 9 wherein the transmitter transmits the wireless control signal at a single power level.

13. The method of claim 9 wherein the transmitter is part of an active remote keyless entry fob.

14. The method of claim 9 wherein the transmitter is part of a passive remote keyless entry fob.

15. A method of controlling a vehicle function with a remote keyless entry system having a vehicle-mounted receiver control circuit that includes a receiver and a remote keyless entry fob having a transmitter and an input device, the method comprising:

actuating the input device;

transmitting a wireless control signal based on actuation of the input device;

receiving the wireless control signal with the receiver;

decoding the wireless control signal with the receiver control circuit to determine whether the wireless control signal is indicative of a range-limited function or a non-range-limited function;

determining an elapsed time value with the receiver control circuit when the wireless control signal is indicative of a range-limited function, the elapsed time value being measured between an end of the wireless control signal and the presence of a noise signal; and performing the range-limited function when the wireless control signal is indicative of the range-limited function and the elapsed time value exceeds a threshold value;

wherein the elapsed time value increases as a distance between the transmitter and the receiver decreases.

16. The method of claim 15 wherein the step of performing the range-limited function further comprises not performing the range-limited function when the elapsed time value does not exceed the threshold value.

17. The method of claim 15 further comprising the step of performing the non-range-limited function when the wireless control signal is not indicative of a range-limited function.

18. The method of claim 15 wherein the receiver control circuit further comprises a comparator having an input and an output at which the noise signal is detected and a capacitor electrically coupled to the input, wherein the elapsed time value varies in proportion to an electrical charge stored by the capacitor and wherein the noise signal is inhibited while the capacitor is discharging.

19. The method of claim 15 wherein the non-range-limited function includes at least one of locking a vehicle closure, closing a vehicle window, and starting a vehicle engine.

20. The method of claim 15 wherein the range-limited function includes at least one of unlocking a vehicle closure and actuating a vehicle closure.

* * * * *

UNITED STATES PATENT AND TRADEMARK OFFICE
CERTIFICATE OF CORRECTION

PATENT NO. : 7,592,895 B2  Page 1 of 1
APPLICATION NO. : 11/163376
DATED : September 22, 2009
INVENTOR(S) : Tang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Twenty-first Day of September, 2010

David J. Kappos
*Director of the United States Patent and Trademark Office*